(12) United States Patent
Parmigiani

(10) Patent No.: US 8,652,389 B2
(45) Date of Patent: Feb. 18, 2014

(54) COMPRESSION MOULDING METHOD FOR REALISING THERMOPLASTIC PRODUCTS

(75) Inventor: Corrado Saverio Parmigiani, Correggio (IT)

(73) Assignee: C.G.M. S.p.A., Correggio (Reggio Emilia) (IT)

( * ) Notice: Subject to any disclaimer, the term of this patent is extended or adjusted under 35 U.S.C. 154(b) by 704 days.

(21) Appl. No.: 12/727,361

(22) Filed: Mar. 19, 2010

(65) Prior Publication Data

US 2010/0237537 A1    Sep. 23, 2010

(30) Foreign Application Priority Data

Mar. 19, 2009  (IT) .............................. RE2009A0025

(51) Int. Cl.
B29C 59/02    (2006.01)

(52) U.S. Cl.
USPC ......................................................... 264/320

(58) Field of Classification Search
USPC ......................................................... 264/320
See application file for complete search history.

(56) References Cited

FOREIGN PATENT DOCUMENTS

| EP | 1052444 A2 | 11/2000 |
|---|---|---|
| EP | 1219399 A1 | 7/2002 |
| JP | 6312427 A | 11/1994 |
| JP | 2005048096 A | 2/2005 |

OTHER PUBLICATIONS

Machine translation of JP-2005048096.*

* cited by examiner

*Primary Examiner* — Yogendra Gupta
*Assistant Examiner* — John Robitaille
(74) *Attorney, Agent, or Firm* — Browdy and Neimark, PLLC

(57) ABSTRACT

A method for realising thermoplastic products, comprising: use of a granular material comprising granules of thermoplastic polymers; inserting a dose (M) of the granular material internally of the chamber (11) of a mold (10); compression of the dose (M) of granular material contained in a chamber (11) of the mold (10); heating an internal surface of the chamber (11) of the mold (10) during the compression up to producing a softening of the thermoplastic granules at least of a most external layer of the dose (M) of granular material compressed in the chamber (11); before the stage of compression and heating, the method includes covering at least a portion of an external surface of the dose (M) of granular material with an opaque film, which film comprises at least an opaque portion such as visually to hide the material covered thereby.

11 Claims, 3 Drawing Sheets

COMPRESSION MOULDING METHOD FOR REALISING THERMOPLASTIC PRODUCTS

The invention relates to realising thermoplastic products being not of polymeric foam, that is thermopolymers having specific weight more than 0.9 Kg per dm$^3$.

The method according to the invention provides compression and heating of thermoplastic material (not being polymeric foam) in granular form internally of a die.

A traditional and consolidated method for realising technical products from thermoplastic material is by injection moulding of polymers.

Injection moulding comprises, briefly, melting the polymer and injecting the molten polymer into a chamber of a mould in order to fashion the product.

The basic material is constituted by plastic granules which are melted internally of a cylinder by means of heat induced by resistances, and by friction generated by an Archimedes screw which rotates internally of the cylinder. The melting point (or glass transition point in the case of amorphous materials) depends on the type of material to be used, and normally varies from 160° C. for low-density polyethylene (LDPE) to 300° C. for polycarbonate (PC).

Once molten, the material is injected into the chamber of the mould by action of the screw. The injection pressure to which the cavity of the mould is subjected is usually in the order of 300-600 Kg/cm2.

In injection moulding, the mould defines the shape to be obtained, enables cooling of the molten plastic rapidly and expels the solid finished product by means of special mechanical means known as extractors.

One of the biggest limitations of injection moulding is the high energy consumption which leads to high working costs.

To obviate this drawback, a different method for realising technical plastic products has been proposed, that is a compression moulding which comprises:

use of thermoplastic material in granular form;
possible pre-heating of the granular material;
insertion of the granular material internally of the chamber of an open mould;
closure and activation of the mould by compression of the granular material contained in the chamber;
heating of the internal surface of the chamber of the mould during compression, up to producing a softening (possibly even melting) of the thermoplastic granules at least of the most external layer of the granular material compressed in the chamber.

In this way, the pressure exerted by the mould tends to compact the granular material, giving it the shape of the product. At the same time, the thermoplastic granules in contact with the surface of the mould tend to soften and drip towards the inside of the chamber, generating a thick net of micro-drips of molten plastic which drip from the outside towards the inside. These micro-drips shower onto the non-molten plastic granules in the centre of the mould chamber and tend to glue them solidly to one another, forming a beehive structure.

The external layer of molten plastic material is then solidified, generally through the cooling of the internal surface of the mould chamber, thus creating a substantially uniform and compact layer which forms the outside "skin" of the product.

The structure obtained has the advantage of being sufficiently resistant, but it has a mean density which is lower than the same volume obtained by injection moulding.

The method does not include fusion of all the plastic material, such that the energy used, since there is not an injection stage, is decidedly less than that required for traditional injection moulding.

The method can also use, as base granular material, either virgin material or recycled material.

Also important is the possibility of using filling granules made of different materials to plastic, such as for example paper, silicon, wood etc, which remain incorporated internally of the product.

Notwithstanding the above-cited advantages, the products realised using this method can be aesthetically unattractive, especially when the base granular material is a mixture of polymers coming from recycling processes, and in general when non-homogeneous material is used.

To mitigate this drawback it is necessary to distribute the granule of the various materials by ordered layers internally of the mould, such that the plastic materials having the lowest melting temperature form the external skin of the product, while the plastic materials having the highest melting temperature and the filler materials, if any, remain hidden internally.

Distributing the materials in an orderly fashion is however a rather complicated operation with respect to the ideal case in which the materials are loaded into the mould mixed homogeneously, which involves a greater complication in the loading devices, and greater process costs.

For this reason, it is also very difficult to introduce into the mould polymers of different colours, should it be required to distribute them in a sufficiently ordered way to obtain products provided with specific coloration or to reproduce precise colour or design effects.

It is of little use to add pigments or other additives to improve the external surface of the product, as they produce nearly no effect due to the incomplete melting of the granules.

The aim of the invention is to obviate the above-mentioned drawbacks with a solution which is simple, rational and relatively inexpensive.

This and other aims are attained thanks to the characteristics of the invention as reported in independent claim 1. The dependent claims delineate preferred and/or particularly advantageous aspects of the invention.

In general terms, the invention makes available a method for realising plastic products by compression and heating thermoplastic material in granular form in moulds, in which however a batch of the granular material at least partly covered with a film is inserted into the chamber of the mould.

The film must made using a material which is preferably though not exclusively plastic, having a melting point which is higher than a temperature to which the internal surface of the mould chamber is heated, such as to maintain the integrity thereof while being in contact with the hot surfaces of the chamber during the stage of softening the granules.

The film can alternatively be made of a layered or poly-coupled material, as long as at least one of the layers is realised using a material having a melting point which is greater than the temperature to which the internal surface of the mould chamber is heated.

The plastic granules which come into contact with the film are heated by the hot mould surfaces as in the prior art, and thus they tend to soften (even melting), originating the micro-drips which glue the none-melted granules at the centre of the chamber.

At the same time the molten plastic granules tend to glue solidly also to the external film, which thus remains whole and adheres to the external surface of the finished product.

It follows that using an at least partially opaque film, the invention has the important advantage of covering and hiding from view at least a portion of the original "skin" of the finished product.

In particular, by using a coloured film, or a film having decorations or ornamental motifs and/or a film which is printed with writing or graphical representations, it is possible to give the finished product a more pleasant appearance and/or place writing or graphic signs thereon.

The covering film also provides some advantages of a productive character, in particular it enables using granular material from a mixture of several non-homogeneous materials, for example having different colours and/or recycled materials, without there being any need to provide additional separating or cleaning treatments, and without any need to distribute the materials in layers internally of the chamber of the mould.

The only condition necessary is the use of a certain quantity of granules of thermoplastic polymers having a relatively low melting point (in particular polyolefins) in order to obtain a rigid external portion and to obtain the internal micro-dripping in order to contain non-melted materials and glue the external film.

It has been experimentally found that high/low density polyethylene and polypropylene are especially appropriate materials for producing a solid external layer and for producing the desired adhesion effects. These materials too can usefully originate from recycling without any mechanical loss in the finished product.

Also important is the possibility of using filler materials for the product which are not plastic, such as for example paper, silicon, wood etc.

In a preferred aspect of the invention, the film of plastic material is conformed as a wrapper (bag), which is filled with the batch of granular material before being placed in the mould cavity.

In this way, the bag completely hides the original aspect of the final plastic product, and further enables an easier management and movement of the batch of granular material.

The invention is described herein below with reference to the accompanying figures of the drawings, which illustrate a preferred though not exclusive embodiment thereof purely by way of example.

Figures from 3 to 5 show a plastic film bag during three stages of the filling operation with batch of granular material.

Figure 2:
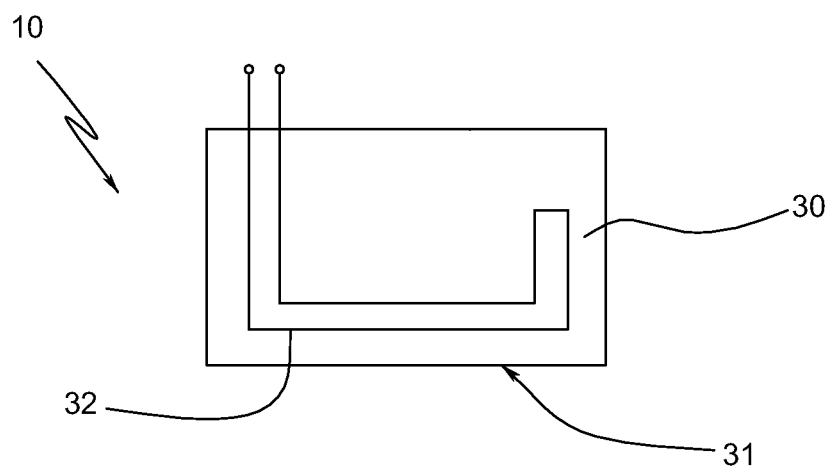
FIG. 2 is a section of the mould of FIG. 1 performed on a vertical plane.
Figure 2:
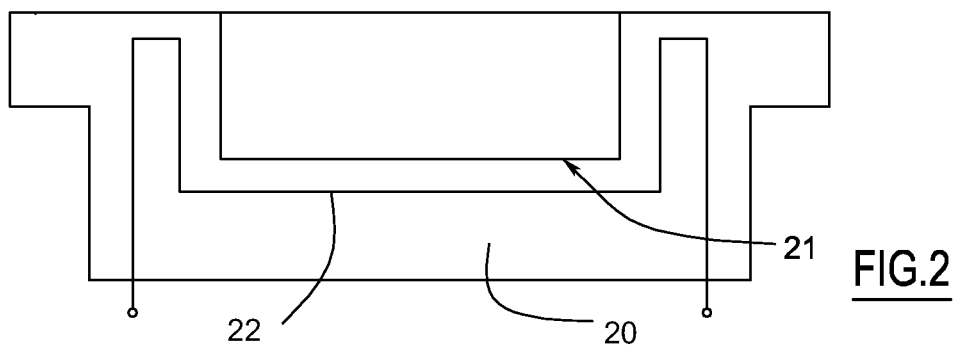
Figure 3:
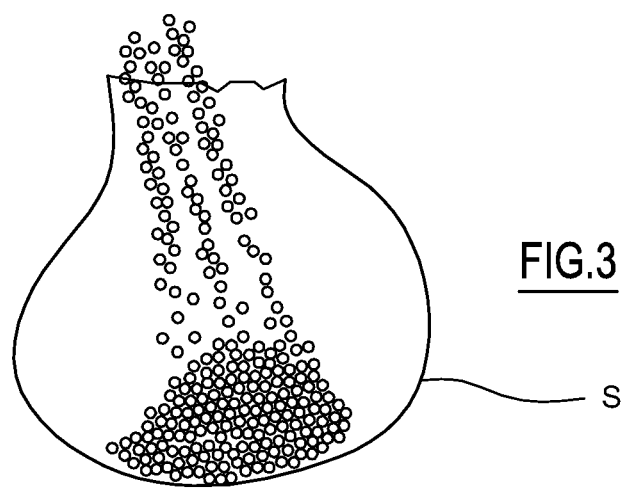
Figure 4:
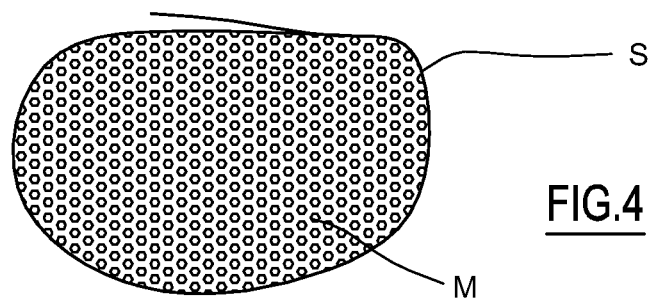
Figure 6:
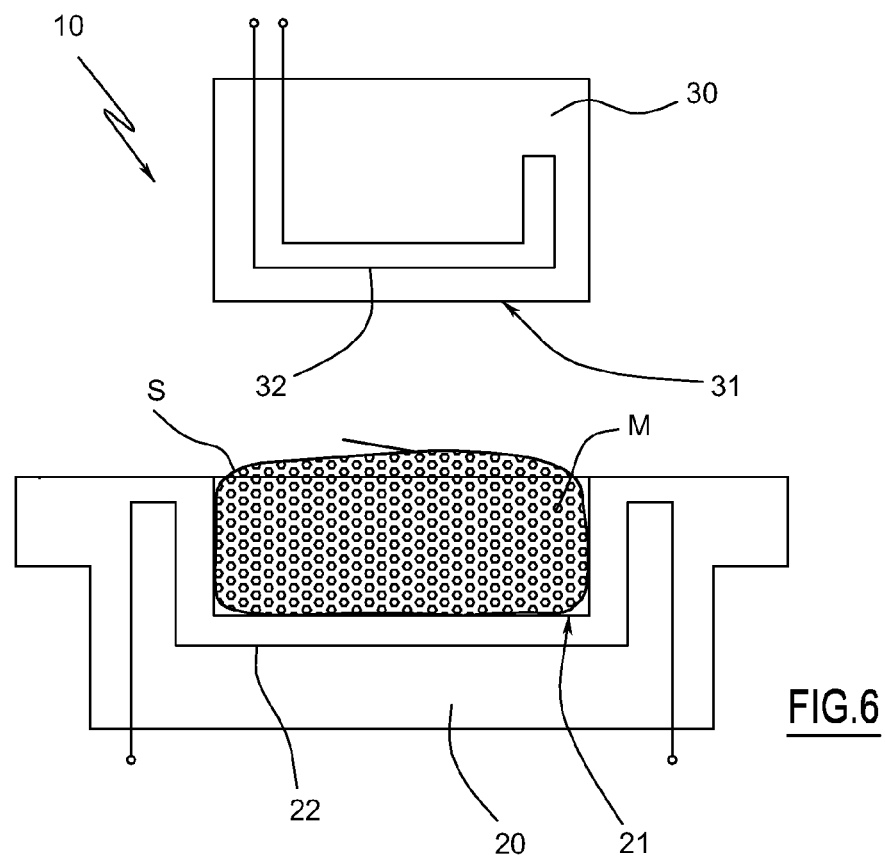
Figure 7:
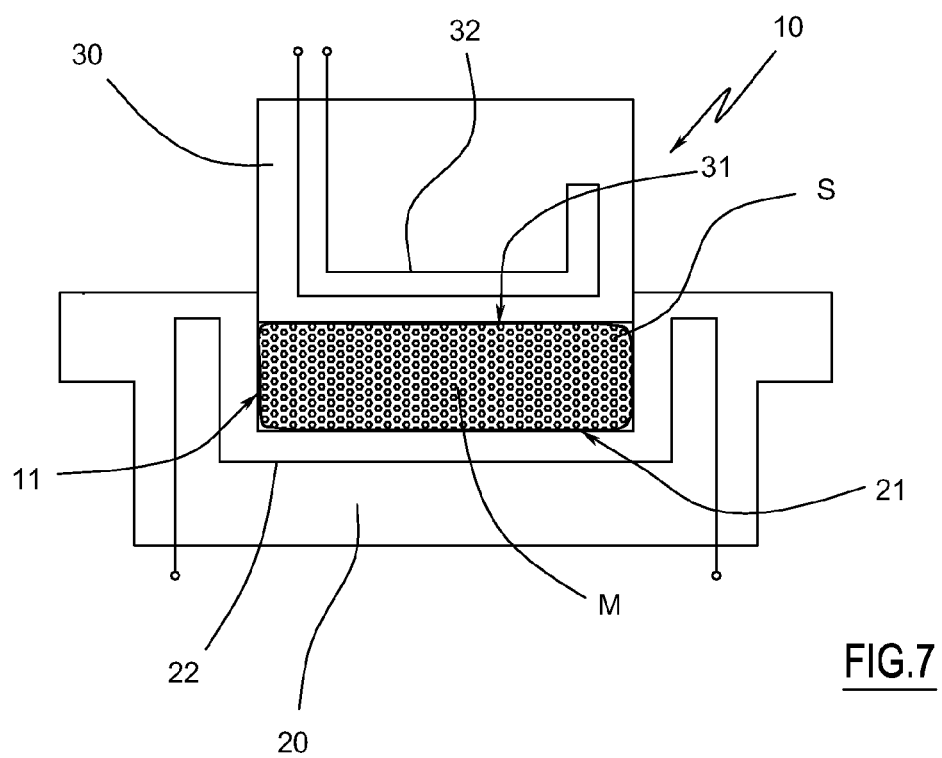

FIGS. 6 and 7 show the mould of FIG. 2 in two successive stages during the treatment of a bag S already filled with granular material.

Figure 1:
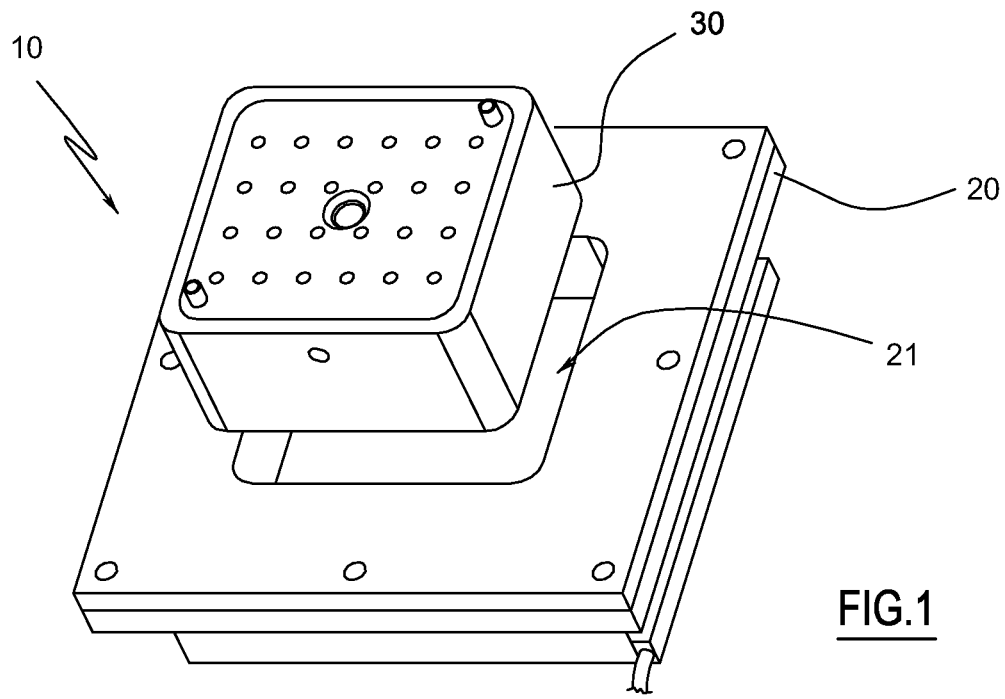
FIG. 1 is an upper-lateral perspective view of a mould used for the method of the invention.

The method for realising plastic products of the invention uses a mould 10 of the type illustrated in FIG. 1, although a mould having different characteristics could also be used.

The mould 10 comprises at least a bottom die 20 defining an internal cavity 21 and at least a punch 30 activated to slide in the internal cavity 21.

The surface of cavity 21 of the bottom die 20 and the surface of punch 30 together define a forming chamber 11 (FIG. 7).

In the compression moulding process performed according to the invention, the punch 30 is penetrated into the cavity 21 to reduce the volume of the forming chamber 11 until the chamber reaches a volume and shape corresponding to the final shape desired for the product. With the term "forming chamber" a chamber is intended which has a single cavity (as illustrated schematically in the figures) or which has a plurality of cavities, such as happens, for example, in multiple moulds.

The mould 10 further comprises means for heating and cooling the internal surfaces of the forming chamber 11, i.e. the internal surface of the cavity 21 of the bottom die 20 and/or the active surface 31 of the punch 30 (i.e. the surface which penetrates into the cavity 21 and delimits, together with the surface of the cavity, the forming chamber 11 of the mould 10).

In the illustrated example, the means comprise a serpentine channeling 22 internally of the bottom die 20 affording a heat exchange with the surface of the cavity 21, and a serpentine channeling 32 internally of the punch for a heat exchange with the active surface 31.

In a first stage (mould heating stage) the two channelings 22 and 32 are located in communication with a heating liquid source (oil), which is not illustrated as it is of known type. The heating liquid coming from the source is pumped into the channelings 22 and 32, thus heating the surfaces which delimit the forming chamber 11 of the mould and thus heating the material located in the chamber, and is then returned newly to the source, where it is once more brought up to the heating temperature. In a second stage (stage of cooling of the mould) the two channelings 22 and 32 are located in communication with a coolant liquid source (oil, also not illustrated as of known type), while the source of the heating liquid is blocked. The coolant liquid coming from the source is pumped into the channelings 22 and 32, where it cools the surfaces which delimit the forming chamber 11 of the mould and thus cools the material placed in the chamber, and is then returned newly to the source, where it is newly brought down to the cooling temperature.

Further characteristics of the mould 10 are completely described in patent application no. RE2008A000073 in the name of the same applicant, to which reference is made for further details.

The method for realising plastic products is schematically illustrated in figures from 3 to 7, and comprises:
pouring into a bag S a dose (i.e. a dosed batch) M of loose granular material, comprising granules of thermoplastic polymers;
preferably pre-heating the bag S thus-filled in a kiln;
inserting the bag S with the dose M of granular material internally of the cavity 21 of the bottom die 20, the punch 30 being at a distance from the bottom die 20,
inserting the punch 30 in the cavity 21 of the bottom mould 20 and performing the compression of the bag S up to impressing the desired shape on the dose M,
heating the internal surface of the chamber 11 of the mould 10 during the compression up to producing the softening of the thermoplastic granules at least of the most external layer of the dose M of granular material contained in the bag S and compressed in the chamber, and
subsequently cooling the internal surface of the chamber 11 of the mould 10 in order to at least partially solidify at least the external layer of the dose M of granular material compressed in the chamber 11 after the granular material has reached the desired shape of the product.

The dose M of granular material comprises granules of thermoplastic polymers, preferably in the form of granules of a shape and size rather like a cereal. These granules can be geometrically dissimilar to one another, for example having a cylindrical or spherical shape, or in the case of materials originating from recycling processes can have an irregular form. It is preferable that the dimensions of the granules should not be very variable among themselves because their volume has an effect on the time required for melting them. A variation from 1 to 8 mm is acceptable for each of the three dimensions defining the approximate volume.

The main groups of thermoplastics usable and present on the market are listed herein below with an indication of the relative melting point, i.e. the temperature at which softening begins:

| LDPE | (low density polyethylene) | 160-220° C. |
|------|---------------------------|-------------|
| HDPE | (high density polyethylene) | 170-230° C. |
| PP   | (polypropylene)           | 200-270° C. |
| PS   | (polystyrene)             | 240° C.     |
| PVC  | (polyvinyl chloride)      | 210° C.     |
| PA   | (polyamide)               | 280° C.     |
| POM  | (polyoxymethylene)        | 200° C.     |
| PET  | (polyethylene terephthalate) | 270° C.  |
| PBT  | (polybutylene terephthalate) | 260° C.  |
| PC   | (polycarbonate)           | 300° C.     |
| ABS  | (acrylonitrile butadiene styrene) | 230° C. |

The granules of plastic origin present in the dose M can be of different polymers among themselves; for example, polyethylene can be mixed with polyamide or polystyrene. Their specific weight is more than 0.9 Kg per $dm^3$. The important point is that the dose M of granular material should contain a mixture of plastic materials having a percentage of not less than 50% of material having a polyolefin base, as these have a lower melting point than the other thermoplastics and are characterised by their bonding capacities in the molten state.

There is also the possibility that the dose M of granular material might contain other filler materials having a different origin to plastics, for example: paper, inert minerals and wood, on condition that the dose M contains overall at least 50% of polyolefins.

Polymers and eventual filler materials making up the dose M of granular material are preferably mixed homogeneously, without there being any need for a precise distribution of the various components.

The method can use both virgin materials and recycled materials, both for the bottom melting part and for the top melting or non-melting part.

The heating of the material placed inside the forming chamber 11 is caused by heat transmitted to the material by the heated surface of the chamber 11. So, the heat transmission proceeds from the surface of chamber 11 toward the inner zone of the material.

The temperature to which the internal surface of the chamber 11 of the mould 10 is heated during compression depends on the type of thermoplastic material present in the dose M.

In general, account must be taken of the fact that the method of the invention does not include total melting of the plastic material but rather only a softening of the external layer of the dose M of granular material contained in the bag S.

The method of the invention also does not need the melting of all the thermoplastic polymers contained in the external layer of the dose M, its being sufficient that only the polymers with the lowest melting points soften, which enables a substantially uniform and compact layer to be obtained to form the external skin of the product, and in which the polymer granules with higher melting points can remain enclosed.

As the dose M is mainly composed of polyethylene grains (polyolefins) having a melting point of about 160° C.-170° C., the heating temperature of the internal surfaces of the chamber 11 of the mould 10 can be about 180° C.

The bag S must be made with a film that can resist and remain substantially whole at the temperature reached by the internal surfaces of the forming chamber 11 during the heating stage.

The film must therefore be made from a material, preferably but not exclusively polymer in nature, having a melting point which is above that to which the surface of the chamber 11 is heated.

It follows that the bag S can be made of a different film according to the heating temperature of the internal surfaces of the chamber 11, and therefore in a final analysis on the basis of the type of thermoplastic polymers present in the dose M of granular material.

In the case under examination, supposing that the heating temperature of the surfaces of the chamber 11 is about 180° C., the bag S may be made for example with a film of polyamide (nylon) having a melting point of about 280° C.

The bag S can also be made of a layered or polycoupled film obtained by superposing of two or more layers (sheets) of different materials, as long as at least one of the layers is made of a material having a melting point which is above that to which the internal surfaces of the chamber 11 of the mould 10 are heated.

In particular, the film can be obtained by superposing two layers of different polymers which have melting points that are respectively above and below the temperature to which the internal surfaces of the chamber 11 of the mould 10 are heated.

In this case, the layer having a higher melting point will preferably be facing outwards, such as to be in direct contact with the surfaces of the mould chamber 11, while the layer having a lower melting point will be facing inwards, such as to be in direct contact with the dose M of granular material. In this way, during the stage of compression and heating, the internal layer of low-melting point polymer might also improve the bonding action of the bag S to the dose M of granular material.

In the follow a list is given of some layered materials available on the market which have been demonstrated to be suitable for this type of application.

Material A: external layer of polypropylene/internal layer of polyethylene (PP/PE).

Material B: external layer of polyamide/internal layer of polyethylene (PA/PE).

Material C: external layer of polyester/internal layer of polyethylene (PET/PE).

Material D: external layer of polyamide/internal layer of polypropylene.

Material E: external layer of polyester/internal layer of polypropylene.

The bag S is at least partly opaque such as to cover and hide from view the dose M of granular material contained therein.

In particular, the bag S can be coloured, can be of a single colour or variegated, and can be printed on with any graphics, among which for example decorative motifs, signs or text messages, which characterise the external appearance of the final product.

Figure 5:
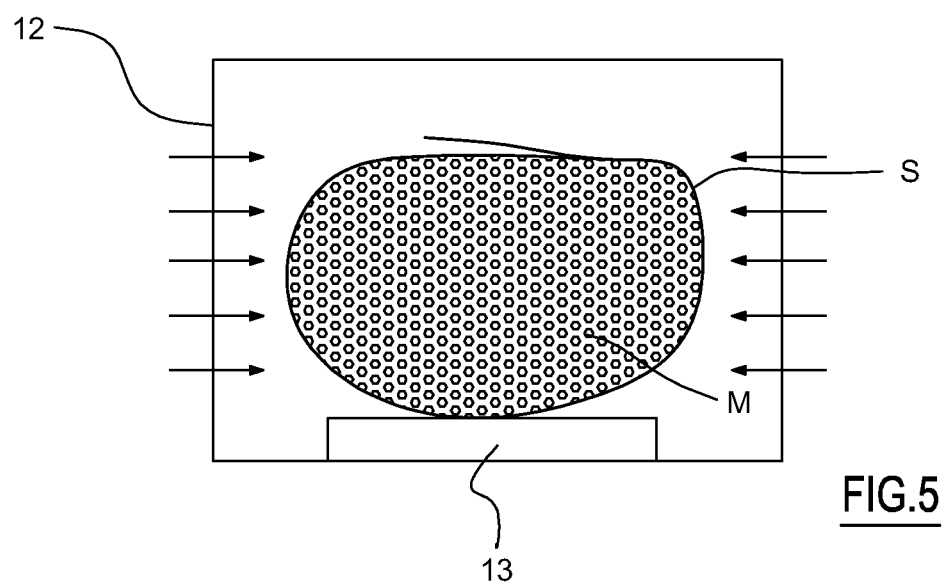

After filling with the dose M of granular material, the bag S is preferably sealed such as to close internally thereof the loose granules (see FIG. 5). In this way, each dose M of loose granules can easily be stored, as well as easily transported and manipulated during the following stage of the method. The sealing of the bag S is preferably done by hot-welding. In this case, the use of a film of layered material is particularly suitable, as the internal layer of low-melting polymer will facilitate the hot-welding operations.

The invention also includes the possibility of filling the bag S with the dose M of granular material by means of a vacuum system.

The vacuum system enables the air between the granules to be eliminated, such as to obtain a more compact bag S which is therefore easier to manipulate, especially when the dose M has a rather large volume.

The bag S is preferably inserted in the cavity 21 of the bottom mould 20 after the dose M of granular material contained internally thereof has been preheated to a temperature of above 60° C., preferably a temperature of about 100-120° C.

As illustrated in FIG. 5, the preheating can be obtained by locating the bag S with the dose M of granular material internally of a chamber 12 in which it is heated by convection, for example struck with jets of hot air (denoted by the arrows).

The bag S can be supported internally of the chamber 12 by a thermally-insulated pedestal 13 in order to protect the bag S from damage caused by long contact with the hot surfaces.

The time that the bag S will remain in the chamber 12 must be such as to heat, preferably uniformly, all the granular material of the dose M and thus also the material in the centre.

This preheating is particularly useful inasmuch as it makes the following compacting and heating stages in the mould 10 more effective, and in particular because it enables the time the bag S remains in the mould 10 necessary for the surface melting of the dose M to be reduced.

The bag S can be inserted internally of the cavity 21 of the mould 20 using automatic or manual means of known type.

This movement and manipulation is particularly simple and secure, because the dose M of loose granular material is contained internally of a bag S.

The mould 10 is heated to a temperature of about 180° C., by means of circulation of the heating liquid, and the heat generated is propagated by induction internally of the cavity and is transferred to the granules of the dose M through the bag S.

The press is then activated, which via the punch 30 compresses the material internally of the cavity 21 defining the geometry of the finished product. The temperature (about 160° C.) and the high pressure are such that the lowest-melting granules of polyolefins are almost melted (softened) and tend to join to one another, forming a cohesive external layer. The softened material also tends to drip towards the inside of the cavity, generating a thick net of micro-drips of molten polymer which from the outside tend to move internally of the material. The micro-drips, striking the non-melted granules tend to glue them solidly to one another, forming a beehive structure. At the same time the softened material also tends to glue the bag S, such as to keep it adhered to the external layer.

The mould is then cooled by means of circulation of low-temperature cooling liquid (about 10° C.), such as to cool the bag S and the material contained therein, facilitating the solidification of the molten part.

Once cooled and sufficiently solidified, the finished product can be detached and expelled from the mould 10, using appropriate mechanical or pneumatic means.

The presence of the bag S which remains whole on the outside of the granular material facilitates the detachment of the finished product from the mould 10, to the point at which the product can be expelled from the mould 10 before completion of the cooling, which will be done on the outside.

The structure of the product obtained exhibits the advantage of being sufficiently resistant, but has a lower apparent mean density with respect to the volume obtained using injection moulding.

The granular material which is melted creates a substantially uniform, compact and rigid layer, which provides consistency to the product. The layer can be of a thickness that varies as desired: it can be very slim or very thick, up until it involves the most internal parts.

The layer is completely covered by the opaque film of the bag S which remains adhered thereto stably and hides it from view.

In this way, the finished product can be coloured in a single colour or variegated, and can be provided with any graphic, such as example decorative motifs, signs or text messages, exclusively on the basis of the chosen aesthetic characteristics applied to the bag S.

This advantage is also reflected in the possibility of preparing the dose M of granular material by simple mixing of the various type of materials to be used, both plastic and other materials, without any need for additional treatments for separation or cleaning in the case of recycled products, and in any case without there being any need to distribute the materials in any precise order.

Although an example has been described in which the dose M of granular material is contained internally of a bag S, the method also comprises the possibility of using only a sheet (flat or tray-shaped) of plastic film, at least partially opaque, which is applied as a sort of label, covering only a portion of the external surface of the dose M of granular material.

In this second case, the dose M of granular material can be formed (poured) directly internally of the cavity of the bottom die 20 of the mould 10, after having applied on the bottom of the bottom die 20 the sheet of plastic film which will therefore be covered by the dose M of granular material. Alternatively the dose M of granular material can first be poured into the cavity 21 and subsequently covered with the sheet of film, before closing the mould.

Obviously numerous modifications of a practical-applicational nature might be brought to the invention, without its forsaking the ambit of the inventive idea as claimed herein below.

The invention claimed is:

1. A compression moulding method for realizing thermoplastic products, being not of polymeric foam, comprising: providing a mould comprising at least a bottom die (20) defining an internal cavity (21) and at least a punch (30), wherein the surface of cavity (21) of the bottom die (20) and the surface of punch (30) together define a forming chamber (11), inserting a dose (M) of granular material comprising granules of thermoplastic polymers internally of the forming chamber (11) of the mould (10); covering at least a portion of an external surface of the dose (M) with a film, which film comprises at least an opaque portion to visually hide the material covered thereby, compressing the granular material and the film contained in the chamber (11) of the mould (10) by penetrating the punch (30) into the cavity (21) to reduce the volume of the forming chamber (11) until the forming chamber reaches a volume and shape corresponding to the final shape desired for the product, and heating an internal surface of the forming chamber (11) of the mould (10), during the compression moulding, thereby causing heating of at least the most external layers of the thermoplastic granules placed inside the forming chamber (11) caused by heat transmitted to the material by the heated surface of the chamber (11) up to a temperature sufficient to produce a softening of the thermoplastic granules at least of a most external layer of the dose (M) of granular material compressed in the chamber (11).

2. The method of claim 1, wherein the film comprises at least a layer having a melting point which is higher than a temperature to which the internal surface of the chamber (11) of the mould (10) is heated.

3. The method of claim 1, wherein the layer having a higher melting point than a temperature to which the internal surface of the chamber (11) of the mould (10) is heated is made of a polymer comprised in a group of polymers constituted by: polypropylene, polyamide and polyester.

4. The method of claim 1, wherein the film is conformed as a bag (S) which is filled with the dose (M) of granular material.

5. The method of claim 4, wherein filling the bag (S) is done in vacuum conditions.

6. The method of claim 4, further comprising sealing the film to close the bag (S) containing the dose (M) of granular material.

7. The method of claim 6, wherein the sealing is obtained by heat-welding.

8. A compression moulding method for realizing thermoplastic products, being not of polymeric foam, comprising:
  providing a mould comprising at least a bottom die (20) defining an internal cavity (21) and at least a punch (30), wherein the surface of cavity (21) of the bottom die (20) and the surface of punch (30) together define a forming chamber (11),
  inserting a dose (M) of granular material comprising granules of thermoplastic polymers internally of the forming chamber (11) of the mould (10);
  covering at least a portion of an external surface of the dose (M) with a film, which film comprises at least an opaque portion to visually hide the material covered thereby,
  compressing the granular material and the film contained in the chamber (11) of the mould (10) by penetrating the punch (30) into the cavity (21) to reduce the volume of the forming chamber (11) until the forming chamber reaches a volume and shape corresponding to the final shape desired for the product, and
  heating an internal surface of the forming chamber (11) of the mould (10), during the compression moulding, thereby causing heating of only a portion of the thermoplastic granules placed inside the forming chamber (11) caused by heat transmitted to the material by the heated surface of the chamber (11) up to a temperature sufficient to produce a softening of the thermoplastic granules at least of a most external layer of the dose (M) of granular material compressed in the chamber (11), wherein the film comprises at least two layers of material having different melting points, of which a layer having a lower melting point is positioned in direct contact with the dose (M) of granular material.

9. The method of claim 8, wherein the layer having a lower melting point is realized in polyethylene or polypropylene.

10. The method of claim 1, further comprising a stage of heating the dose (M) of granular material to a temperature of higher than 60° C. before inserting it in the chamber (11) of the mould (10).

11. The method of claim 1, further comprising a stage of cooling an internal surface of the chamber (11) of the mould (10) in order to solidify at least the external layer of the granular material compressed in the chamber (11) after softening.

\* \* \* \* \*